United States Patent Office 3,399,195
Patented Aug. 27, 1968

3,399,195
THEOPHYLLINE DERIVATIVES
Adolf Stachel, Rolf-Eberhard Nitz, and Klaus Resag, Frankfurt am Main-Fechenheim, and Horst Kreiskott, Hochstadt, Kreis Hanau, Germany, assignors to Cassella Farbwerke Mainkur Aktiengesellschaft, Frankfurt am Main-Fechenheim, Germany, a company of Germany
No Drawing. Filed June 28, 1967, Ser. No. 649,472
Claims priority, application Germany, July 2, 1966,
C 39,516
3 Claims. (Cl. 260—256)

ABSTRACT OF THE DISCLOSURE

Various types of vasodilators have previously been suggested but to date no generally effective compound has been found because of low or short effectiveness or undesirable side effects. Applicants have discovered a new class of compounds with particularly effective coronary dilator properties which are, in fact, superior to well-known substances of this kind. In addition, they possess a central nervous system depressor activity which is desirable from the therapeutic point of view. These new compounds are piperazinyl-theophylline derivatives having the structural formula

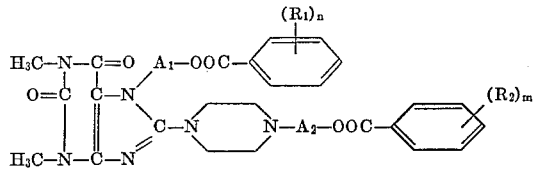

wherein $A_1$ is a straight or branched alkylene radical containing 2–4 carbon atoms, $A_2$ is a straight or branched alkylene or lower alkoxyalkylene radical containing 2–6 carbon atoms, $R_1$ and $R_2$ are alkoxy groups containing 1 or 2 carbon atoms and $m$ and $n$ are integers selected from 1, 2 or 3.

FIELD OF THE INVENTION

The present invention relates to new, therapeutically valuable theophylline derivatives having the structural formula

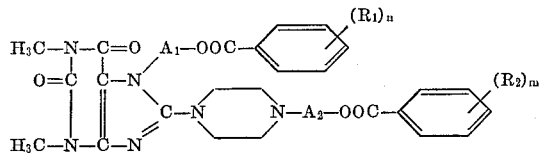

wherein $A_1$ and $A_2$ represent straight or branched alkylene radicals containing 2–4 carbon atoms, whereby $A_2$ may be substituted by a lower alkoxy group, $R_1$ and $R_2$ stand for alkoxy groups having 1 or 2 carbon atoms, $n$ and $m$ are the integers 1, 2, or 3.

DESCRIPTION

The new theophylline derivatives which are the subject of the present invention can be produced in a number of ways including (a) reacting, possibly in the presence of an acid-binding agent, a theophylline derivative having the structural formula

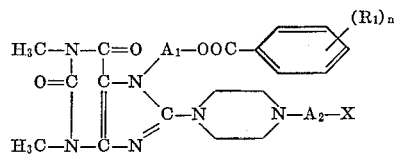

wherein X stands for the hydroxy group or a halogen atom, with an alkoxy benzoic acid having the structural formula

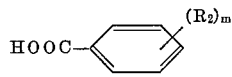

or with a functional derivative or an alkali metal salt of this acid; or by (b) condensing, possibly in the presence of an acid-binding agent, a theophylline derivative having the structural formula

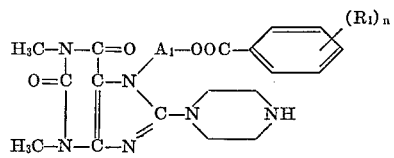

with an alkoxy benzoic acid haloalkyl ester having the general formula

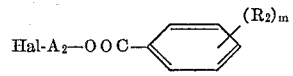

wherein Hal represents a halogen atom; or by (c) reacting, in the case where the residues

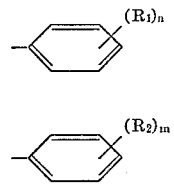

and have the same meaning, a theophylline derivative having the structural formula

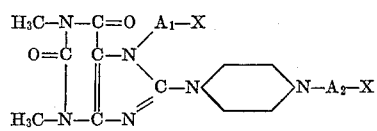

with an alkoxy benzoic acid having the general formula

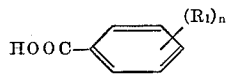

or with a functional derivative or an alkali metal salt of this acid, possibly in the presence of an acid-binding agent, in the molar ratio of 1:2. In each case $R_1$, $R_2$, $A_1$, $A_2$ and $m$ and $n$ have the meanings set out above. Other suitable methods of producing these new derivatives will, no doubt, be evident to one skilled in the art.

The salts of the products produced in the above manner are colorless, crystalline, water-soluble substances. They are valuble pharmaceuticals and, in particular, excellent coronary dilators which are, in this respect, superior to well-known substances of this kind. In addition, these products still possess a central nervous system depressor activity, which is desirable from the therapeutic point of view.

The following specific examples are given to illustrate suitable methods of producing our new piperazine-theophylline derivatives. It will be understood, however, that applicants are not limited to the particular methods disclosed in these examples and that other suitable methods for their production may be obvious to one skilled in the art. Applicants, therefore, claim the new derivatives disclosed herein so long as they fall within the scope of the appended claims, regardless of the method used for their production.

Example 1.—7-[3-(3-(3,4,5-trimethoxybenzoxy)-propyl]-8 - [4 - {2 - (3,4,5 - trimethoxy - benzoxy) - ethyl} - 1-piperazinyl]-theophylline hydrochloride 28.7 g. (0.05 mol) 7-[3-(3,4,5-trimethoxybenzoxy)-propyl] - 8- [4 - {2 - hydroxyethyl} - 1 - piperazinyl]-theophylline are dissolved in 200 cc. anhydrous benzene. Then 5.3 g. (0.05 mol) anhydrous sodium carbonate are added, upon which a solution of 11.5 g. (0.05 mol) 3,4,5-trimethoxybenzoyl chloride in 100 cc. anhydrous benzene is added dropwise with stirring at room temperature within half an hour. The reaction mixture is stirred at room temperature for 1–2 hours, then it is heated for 3–4 hours under reflux. While still hot, it is filtered off from insoluble parts of the filtrate is evaporated to dryness in the water-jet vacuum at 50° C. The residue is dissolved in 500 cc. anhydrous ether, the hydrochloride of the 7-[3-(3,4,5-trimethyoxybenzoxy)propyl]-8-[4-{2 - (3,4,5 - trimethoxybenzoxy) - ethyl} - 1 - piperazinyl]-theophylline is filtered and precipitated with hydrochloric acid in ether. Recrystallized from anhydrous alcohol, it is obtained in the form of colorless crystals having a melting point of 231° C. (decomposition). Yields: 25 g.=63% of the theoretical.

The 7-[3-(3,4,5-trimethoxybenzoxy)-propyl]-8-[4-{2-hydroxyethyl}-1-piperazinyl]-theophylline required as starting material may be prepared as described under (a) or (b) below, or by other suitable methods.

(a) 7-[-(3,4,5-trimethoxybenzoxy)-propyl]-8-bromo-theophylline: 52 g. (0.2 mol) 8-bromo-theophylline and 57.6 g. (0.2) mol 3,4,5-trimethoxy benzoic acid -(3-chloropropyl)-ester and stirred at 100° C. for 24 hours whilst adding 27.6 g. (0.2 mol) anhydrous potassium carbonate in 150 cc. dimethyl formamide; the reaction mixture is then cooled down to 0° C., the crystallization product is filtered off with suction, washed with water, dilute aqueous caustic soda solution and again with water. Recrystallized from toluene, the 7-[3-(3,4,5-trimethoxybenzoxy)-propyl]-8-bromo-theophylline is obtained in the form of colorless crystals having a melting point of 175° C. Yield: 100 g.=97% of the theoretical.

(b) Alternatively, the 7-[3-(3,4,5-trimethoxybenzoxy)-propyl] - 8 - [4 - {2 - hydroxy - ethyl} - 1 - piperazinyl]-theophylline may be prepared as follows:

After a solution of 51 g. (0.1 mol) 7-[3-(3,4,5-trimethoxybenzoxy)-propyl]-8-bromo-theophylline in 250 cc. anhydrous chlorobenzene has been admixed with 10.6 g. (0.1 mol) anhydrous sodium carbonate, a solution of 13 g. (0.1 mol) N-(2-hydroxyethyl)-piperazine in 100 cc. chlorobenzene is added dropwise with stirring, at 50–60° C. during 1 hour. The reaction mixture is then stirred for 12 hours with boiling under reflux while hot, it is filtered off with suction from the precipitated common salt, and the filtrate is concentrated in the water-jet vacuum at 50° C. The remainder is a yellow, viscous oil that crystallizes when triturated with ether. After recrystallization from ethyl acetate, the 7-[3-(3,4,5-trimethoxybenzoxy)-propyl] - 8 - [4 - {2 - hydroxyethyl} - 1 - piperazinyl]-theophylline is obtained in the form of colorless crystals having a melting point of 130° C. The hydrochloride has a melting point of 204° C. (decomposition). Yield: 48 g.=86% of the theoretical.

Other theophylline derivatives of our invention can be prepared as above described from the starting materials listed below obtained as set out in (a) and (b) of Example 1:

7 - [3 - (3,4,5 - trimethoxybenzoxy) - propyl] - 8 - [4-{3-hydroxypropyl}-1-piperazinyl]-theophylline, melting point 150° C.

7 - [3 - (3,4,5 - trimethoxybenzoxy) - propyl] - 8 - [4-{2-hydroxypropyl}-1-piperazinyl]-theophylline, melting point 147° C.

7 - [3 - (3,4,5 - trimethoxybenzoxy) - propyl] - 8 - [4-{3 - methoxy - 2 - hydroxypropyl} - 1 - piperazinyl]-theophylline, melting point 129° C.

7 - [3 - 3,4,5 - trimethoxybenzoxy) - propyl] - 8 - [4-{4-hydroxybutyl} - 1 - piperazinyl] - theophylline, melting point 141° C.

7 - [2 - (3,4,5 - trimethoxybenzoxy) - ethyl] - 8 - [4 - {2-hydroxyethyl} - 1 - piperazinyl] - theophylline, melting point 140° C.

7 - [2 - (3,4,5 - trimethoxybenzoxy) - ethyl] - 8 - [4 - {3-hydroxypropyl} - 1 - piperazinyl] - theophylline, melting point 130° C.

7 - [2 - (3,4,5 - trimethoxybenzoxy) - ethyl] - 8 - [4 - {2-hydroxypropyl} - 1 - piperazinyl] - theophylline, melting point 115° C.

7 - [2 - (3,4,5 - trimethoxybenzoxy) - ethyl] - 8 - [4 - {4-hydroxybutyl} - 1 - piperazinyl] - theophylline, melting point 128° C.

7 - [2 - (3,4,5 - trimethoxybenzoxy) - ethyl] - 8 - [4 - {3-methoxy - 2 - hydroxypropyl} - 1 - piperazinyl] - theophylline, melting point 106° C.

7 - [2 - (3,5 - dimethoxybenzoxy) - ethyl] - 8 - [4 - {2-hydroxypropyl} - 1 - piperazinyl] - theophylline, melting point 168° C.

7 - [2 - (3,5 - dimethoxybenzoxy) - ethyl] - 8 - [4 - {3-hydroxypropyl} - 1 - piperazinyl] - theophylline, melting point 166° C.

7 - [3 - (4 - methoxybenzoxy) - propyl] - 8 - [4 - {3 - hydroxypropyl}-1-piperazinyl]-theophylline, melting point 123° C.

Example 2.—7 - [2 - (3,4,5-trimethoxybenzoxy)-ethyl]-8-[4-{3-(3,4,5-trimethoxybenzoxy - propyl} - 1 - piperazinyl]-theophylline hydrochloride 50.2 g. (0.1 mol) 7-[2-(3,4,5-trimethoxybenzoxy)-ethyl]-8-[1-piperazinyl]-theophylline are dissolved in 200 cc. dimethyl formamide, and, after the addition of 13.8 g. (0.1 mol) anhydrous potassium carbonate, stirred at 100° C. for 12 hours together with 29 g. (0.1 mol) 3,4,5-trimethoxybenzoic acid (3-chloropropyl)-ester. The reaction mixture is then concentrated in the water-jet vacuum. The residue is stirred with 300 cc. ethyl acetate, the ethyl acetate filtrate is filtered and washed several times with water. It is dried over anhydrous sodium sulfate and evaporated to dryness at 40° C. in the water-jet vacuum. The residue is dissolved in 250 cc. anhydrous ether and the filtrate is admixed with hydrochloric acid in ether. Thus, the 7-[2-(3,4,5-trimethoxybenzoxy)-ethyl]-8-[4-{3-(3,4,5 - trimethoxybenzoxy) - propyl} - 1 - piperazinyl]-theophylline hydrochloride is obtained in the form of colorless crystals. Recrystallized from anhydrous alcohol, it melts at 140–143° C. (with decomposition). Yield: 53 g.=67% of the theoretical.

The 7-[2-(3,4,5-trimethoxybenzoxy)-ethyl]-8-[1-piperazinyl]-theophylline required as starting material may be prepared as follows:

A mixture of 40 g. piperazine, 16 g. anhydrous sodium carbonate, and 75.5 g. 7-[2-(3,4,5-trimethoxybenzoxy)-ethyl]-8-bromo-theophylline is stirred in 300 cc. chlorobenzene with boiling under reflux for 24 hours. While still hot, it is filtered off with suction from insoluble parts and the filtrate is evaporated to dryness at 60° C. in the water-jet vacuum. The residue is admixed with 500 cc. water and stirred at 50–60° C. for 1–2 hours. Thereupon the mixture is filtered off with suction while still warm, and the residue is recrystallized from ethyl acetate. Thus, the 7-[2-(3,4,5-trimethoxybenzoxy)-ethyl] - 8 - [1 - piperazinyl]-theophylline is obtained in the form of colorless crystals having a melting point of 167–169° C.

Example 3.—7-[3-(3,4,5-trimethoxybenzoxy)-propyl]-8-[4-{2-(3,4,5-trimethoxybenzoxy)-propyl} - 1 - piperazinyl]-theophylline hydrochloride 38.0 g. (0.1 mol) 7-[3-hydroxypropyl]-8-[4-{2-hydroxypropyl}-1-piperazinyl]-theophylline are dissolved in 300 cc. anhydrous benzene and, after the addition of 20.2 g. (0.2 mol) triethylamine, a solution of 46 g. (0.2 mol) 3,4,5-trimethoxybenzoyl chloride in 100 cc. anhydrous benzene is added dropwise. Subsequently, the reaction mixture is stirred at room temperature for 3–4 hours and then with boiling under reflux for another 2 hours. While still hot, it is then filtered off with suction from insoluble parts and the solvent is evaporated to dryness at 50° C. in the water-jet vacuum. The residue is dissolved in 200 cc. ethyl acetate. On allowing it to stand for 20 hours, it is filtered and the filtrate is reduced to a volume of about 50 cc. in the water-jet vacuum. It is admixed with hydrochloric acid in ether until Congo paper turns blue, the hydrochloride of the 7-[3-(3,4,5-trimethoxybenzoxy)-propyl] - 8 - [4 - {2 - (3,4,5-trimethoxybenzoxy)-propyl}-1-piperazinyl]-theophylline crystallizing out simultaneously. After isolation in the usual manner, the hydrochloride is obtained in the form of colorless crystals which decompose at 125° C. Yield: 40 g.=50% of the theoretical.

Analogously, as stated in the preceding examples, the following compounds may be prepared under the present invention:

7-[3-(3,4,5-trimethoxybenzoxy)-propyl]-8-[4-{3-(3,4,5-trimethoxybenzoxy)-propyl}-1-piperazinyl]-theophylline hydrochloride, melting point 188° C. (decomposition)
7-[3-(3,4,5-trimethoxybenzoxy)-propyl]-8-[4-{2-(3,4,5-trimethoxybenzoxy)-3-methoxy-propyl}-1-piperazinyl]-theophylline hydrochloride, melting point 95° C. (decomposition)
7-[2-(3,4,5-trimethoxybenzoxy)-ethyl]-8-[4-{2-(3,4,5-trimethoxybenzoxy)-ethyl}-1-piperazinyl]-theophylline hydrochloride, melting point 105° C. (decomposition)
7-[2-(3,4,5-trimethoxybenzoxy)-ethyl]-8-[4-{4-(3,4,5-trimethoxybenzoxy)-butyl}-1-piperazinyl]-theophylline hydrochloride, melting point 165° C. (decomposition)
7-[2-(3,5-dimethoxybenzoxy)-ethyl]-8-[4-{2-(3,4,5-trimethoxybenzoxy)-propyl}-1-piperazinyl]-theophylline hydrochloride, melting point 115° C. (decomposition)
7-[2-(3,5-dimethoxybenzoxy)-ethyl]-8-[4-{3-(3,5-dimethoxybenzoxy)-propyl}-1-piperazinyl]-theophylline hydrochloride, melting point 123° C. (decomposition)
7-[3-(4-methoxybenzoxy)-propyl]-8-[4-{3-(3,4,5-trimethoxybenzoxy)-propyl}-1-piperazinyl-theophylline hydrochloride, melting point 107° C. (decomposition)
7-[3-(3,4,5-trimethoxybenzoxy)-propyl]-8-[4-{4-(3,4,5,-trimethoxybenzoxy)-butyl}-1-piperazinyl]theophylline hydrochloride, melting point 123° C. (decomposition)
7-[2-(3,4,5-trimethoxybenzoxy)-ethyl]-8-[4-{2-(3,4,5-trimethoxybenzoxy)-propyl}-1-piperazinyl]-theophylline hydrochloride, melting point 115° C. (decomposition)
7-[2-(3,4,5-trimethoxybenzoxy)-ethyl]-8-[4-{2-(3,4,5-trimethoxybenzoxy)-3-methoxy-propyl}-1-piperazinyl]-theophylline hydrochloride, melting point 113° C. (decomposition)

The vasodilator action of our new compounds on the coronary vessels was determined in dogs according to the methods described by W. K. A. Schaper and his coworkers (see W. K. A. Schaper, R. Xhonneux, and J. M. Bogaard, "Uber die kontinuierliche Messung des Sauerstoffdrucks im venosen Coronarblut," Naunyn-Schmiedeberg's Arch. exp. Path. u. Pharmak. 245, 383–289 (1963)). The test preparations were applied intravenously to the narcotized and spontaneously breathing animals. Under these test conditions the dilatation of the coronary arteries caused by the test substances along with the increase in the coronary blood flow led to an increase in the oxygen tension in the coronary veinous blood. This oxygen tension was measured according to polarographic methods by means of a platinum electrode of the Gleichmann-Lubbers type (see U. Gleichmann and D. W. Lubbers "Die Messung des Sauerstoffdruckes in Gasen und Flussigkeiten mit der Platin-Elektrode unter besonderer Berucksichtigung der Messung in Blut," Pflugers Arch. 271, 431–455 (1960)). The heart rate was continuously measured by electronic methods from systolic peaks of the arterial blood pressure.

The following table gives the results of the pharmacological investigations which were carried out as above described. The preparations were tested in the form of their respective hydrochlorides:

| Preparation | LD 50 g./kg., Mouse | Dosage mg./kg., I.V. | Maximal Increase of Oxygen Tension in the Coronary Veinous Blood | | Maximal Change in the Heart Rate | |
|---|---|---|---|---|---|---|
| | | | In percent | In minutes | In percent | In minutes |
| 7-[2-(3,5-dimethoxybenzoxy)-ethyl]-8-[4-{2-(3,4,5-trimethoxybenzoxy)-propyl}-1-piperazinyl]-theophylline. | | 2.0 | +132 | 5 | −11 | 15 |
| 7-[2-(3,5-dimethoxybenzoxy)-ethyl]-8-[4-{3-(3,5-dimethoxybenzoxy)-propyl}-1-piperazinyl]-theophylline. | | 2.0 | +33 | 20 | −12 | 20 |
| 7-[2-(3,4,5-trimethoxybenzoxy)-ethyl]-8-[4-{2-(3,4,5-trimethoxybenzoxy)-ethyl]-1-piperazinyl]-theophylline. | I.V.: 0.15 | 2.0 | +73 | 20 | +9 | 5 |
| 7-[3-(4-methoxybenzoxy)-propyl]-8-[4-{3-(3,4,5-trimethoxybenzoxy)-propyl}-1-piperazinyl]-theophylline. | | 2.0 | +32 | 40 | −14 | 10 |
| 7-[3-(3,4,5-trimethoxybenzoxy)-propyl]-8-[4-{2-(3,4,5-trimethoxybenzoxy)-ethyl}-1-piperazinyl]-theophylline. | I.B.: 0.024 | 2.0 | +132 | 35 | −12 | 35 |
| 7-[3-(3,4,5-trimethoxybenzoxy)-propyl]-8-[4-{2-(3,4,5-trimethoxybenzoxy)-propyl}-1-piperazinyl]-theophylline. | I.P.: 0.9 | 2.0 | +104 | 40 | −53 | 40 |
| 7-[3-(3,4,5-trimethoxybenzoxy)-propyl]-8-[4-{2-(3,4,5-trimethoxybenzoxy)-3-methoxypropyl}-1-piperazinyl]-theophylline. | I.P.: 1.0 | 2.0 | +98 | 30 | −11 | 30 |

In the preparation of dragées and tablets containing as essential active ingredient in piperazinyl theophylline derivatives of our invention these substances may be admixed with the conventional solid tabletting adjuvants, such as starch, lactose, talc and the like. Any of the tabletting materials and carriers customary in pharmaceutical practice may be employed.

For the preparation of the injection solutions the hydrochlorides of the piperazinyl theophylline derivatives are particularly suited since they have mostly a good water-solubility. Injection solutions of water-insoluble products may of course be prepared in the conventional manner by concurrently using well-known suspending agents, emulsifiers and/or solubilizers.

What is claimed is:
1. A compound of the formula

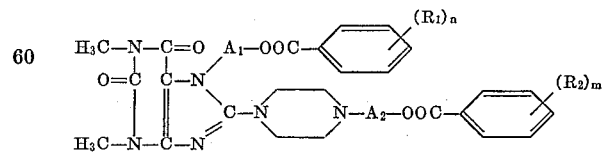

wherein $A_1$ is a straight or branched alkylene radical containing 2–4 carbon atoms, $A_2$ is a straight or branched alkylene or lower alkoxyalkylene radical containing 2–6 carbon atoms, $R_1$ and $R_2$ are alkoxy groups containing 1 or 2 carbon atoms, and $n$ and $m$ are integers selected from 1, 2, and 3.

2. A compound as claimed in claim 1, wherein $R_1$ is $OCH_3$, $R_2$ is $OCH_3$, $A_1$ is selected from ethylene and propylene, and $m$ is 3.

3. A compound as claimed in claim 1 selected from the group consisting of:

7-[2-(3-5-dimethoxybenzoxy)-ethyl]-8-[4-{2-(3,4,5-trimethoxybenzoxy)-propyl}-1-piperazinyl]-theophylline 7-[2-(3,5-dimethoxybenzoxy)-ethyl]-8-[4-{3-(3,5-dimethoxybenzoxy)-propyl}-1-piperazinyl]-theophylline 7-[2-(3,4,5-trimethoxybenzoxy)-ethyl]-8-[4-{2-(3,4,5-trimethoxybenzoxy)-ethyl}-1-piperazinyl]-theophylline 7-[3-(4-methoxybenzoxy)-propyl]-8-[4-{3-(3,4,5-trimethoxybenzoxy)-propyl}-1-piperazinyl]-theophylline 7-[3-(3,4,5-trimethoxybenzoxy)-propyl]-8-[4-{2-(3,4,5-trimethoxybenzoxy)-ethyl}-1-piperazinyl]-theophylline 7-[3-(3,4,5-trimethoxybenzoxy)-propyl]-8-[4-{2-(3,4,5-trimethoxybenzoxy)-propyl}-1-piperazinyl]-theophylline 7-[3-(3,4,5-trimethoxybenzoxy)-propyl]-8-[4-{2-(3,4,5-trimethoxybenzoxy)-3-methoxy-propyl}-1-piperazinyl]-theophylline 7-[3-(3,4,5-trimethoxybenzoxy)-propyl]-8-[4-{3-(3,4,5-trimethoxybenzoxy)-propyl}-1-piperazinyl]-theophylline 7-[2-(3,4,5-trimethoxybenzoxy)-ethyl]-8-[4-{2-(3,4,5-trimethoxybenzoxy)-butyl}-1-piperazinyl]-theophylline 7-[2-(3,4,5-trimethoxybenzoxy)-ethyl]-8-[4-{3-(3,4,5-trimethoxybenzoxy)-propyl}-1-piperazinyl]-theophylline 7-[3-(3,4,5-trimethoxybenzoxy)-propyl]-8-[4-{4-(3,4,5-trimethoxybenzoxy)-butyl}-1-piperazinyl]-theophylline 7-[2-(3,4,5-trimethoxybenzoxy)-ethyl]-8-[4-{2-(3,4,5-trimethoxybenzoxy)-propyl}-1-piperazinyl]-theophylline 7-[2-(3,4,5-trimethoxybenzoxy)-ethyl]-8-[4-{2-(3,4,5-trimethoxybenzoxy)-3-methoxy-propyl}-1-piperazinyl]-theophylline

References Cited

UNITED STATES PATENTS 2,887,486   5/1959   Leake et al. _____ 260—256

NICHOLAS S. RIZZO, *Primary Examiner.*

A. M. TIGHE, *Assistant Examiner.*